Nov. 28, 1972   R. W. BUCHER   3,704,190
METHOD OF MAKING A HIGH STRENGTH FITTING
FOR A FLEXIBLE WALL CONTAINER
Filed July 19, 1971

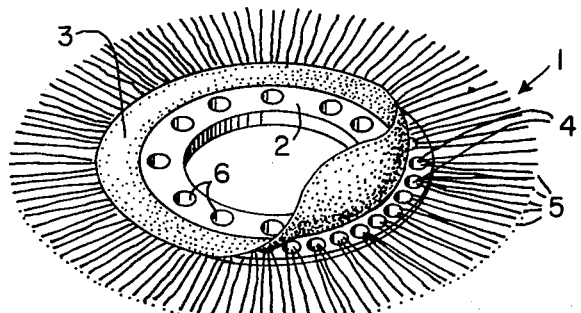

FIG. 1

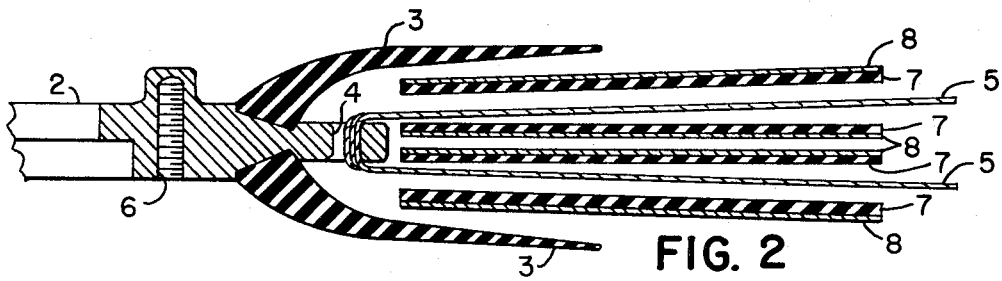

FIG. 2

1. INSERT STRANDS IN HOLES OF FITTING.

2. POSITION BINDER LAYERS RELATIVE TO STRANDS.

3. ORIENT STRANDS IN RADIALLY OUTWARDLY EXTENDING POSITION.

4. APPLY PRESSURE TO EMBED STRANDS IN BINDER LAYERS.

5. TRIM OUTER EDGE OF ASSEMBLED PART.

FIG. 3

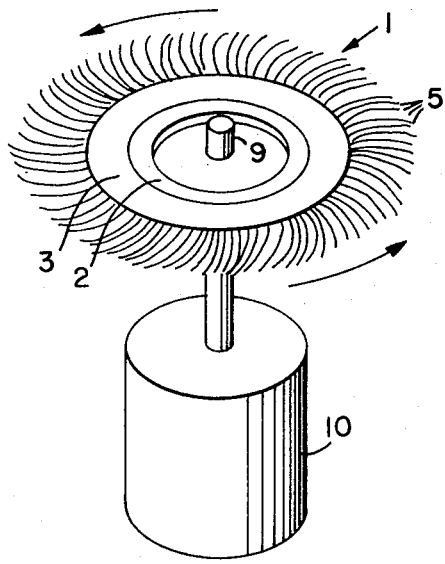

FIG. 4

INVENTOR.
ROBERT W. BUCHER
BY *P. Milliken*
ATTORNEY

United States Patent Office 3,704,190
Patented Nov. 28, 1972

3,704,190
METHOD OF MAKING A HIGH STRENGTH FITTING FOR A FLEXIBLE WALL CONTAINER
Robert W. Bucher, Glendale, Ariz., assignor to The Goodyear Tire & Rubber Company, Akron, Ohio
Filed July 19, 1971, Ser. No. 163,854
Int. Cl. B32b 31/18
U.S. Cl. 156—74
6 Claims

ABSTRACT OF THE DISCLOSURE

A method of making a high strength fitting for a flexible wall container such as a fuel tank or the like comprising the steps of inserting flexible strands or cords through holes in a rigid ring member, rotating the ring member to orient the strands in a radially outwardly extending position, positioning binder layers adjacent the strands, applying pressure to embed the strands in the binder and trimming the radially outer edge of the assembled part.

This invention relates to a method of making a high strength fitting for a flexible wall container such as a fuel tank for aircraft or the like.

BACKGROUND OF THE INVENTION

In the past, difficulty has been encountered in developing fuel tank fittings which are of sufficient strength to withstand the high impact loading encountered during a crash. This has been a particular problem in helicopter fuel tanks. The problem is caused primarily by the difficulty in fastening a rigid metal portion of the fitting to the flexible rubberized fabric wall of the tank. To assure that the fitting does not pull loose from the wall, some type of mechanical linkage between the flexible and rigid parts is necessary.

OBJECTS OF THE INVENTION

It is an object of this invention to provide a method of making a high strength fuel tank fitting which can be securely adhered to the flexible wall of a fuel tank.

BRIEF DESCRIPTION OF THE DRAWINGS

FIG. 1 shows a perspective view of a partially assembled fuel tank fitting with flexible strands inserted in holes in a rigid member;

FIG. 2 is a fragmentary cross-sectional view showing a fitting similar to that in FIG. 1 with the binder layers in their relative position with respect to the strands;

FIG. 3 is a flow diagram showing the steps in the making of the fitting according to the invention; and FIG. 4 is a perspective view showing a fitting being rotated to orient the strands in a radially outwardly extending position.

DESCRIPTION OF THE PREFERRED EMBODIMENTS

Referring now to the drawings and in particular to FIG. 1, a fuel tank fitting assembly is indicated generally by the numeral 1. The fitting assembly 1 is designed to be adhered to the flexible fabric-reinforced wall of a fuel tank in a manner similar to that shown in FIG. 1 of U.S. Pat. No. 3,534,987 in which I am one of the co-inventors. The fitting assembly 1 as shown in FIG. 1 has a rigid metal ring 2 to which is attached on each side thereof, a wedge-shaped rubber filler ring 3. The filler ring 3 has been turned back in FIG. 1 to reveal a circumferential row of holes 4 near the outer edge of the ring 2. Each of the holes 4 has a series of cords or strands passing therethrough and extending radially outwardly therefrom on each side of the ring 2. Another row of holes 6 is positioned radially inwardly from the holes 4 for the purpose of attaching cover plates or other members to the fitting. These holes 6 may be threaded as shown in FIG. 2. In FIG. 2 the strands 5 are shown passing through one of the holes 4 and extending radially outwardly therefrom. Positioned on each side of both the top and bottom portion of the strand 5 is a binder layer 7 of partially cured rubber or the like which has a backing layer 8 of plastic or other suitable material to prevent the binder layer from adhering at portions of the fitting assembly which are to be kept separated for receiving the layers of the flexible fabric in the fuel tank. The backing layers 8 shown in FIG. 2 are positioned in such manner that they will prevent the binder layers 7 from adhering to the rubber filler rings 3 and from adhering to each other at the two centermost layers. It can be seen, however, that when pressure is applied to the binder layers 7 and the layers of strands 5, the strands 5 will become embedded between two of the binder layers 7. This means that there are two separate layers of strands 5 encapsulated within the binder material to which the fabric material of the fuel tank can be adhered.

Referring now to FIG. 3, the basic steps of assembling the fuel tank fitting are shown. First the strands 5 are inserted in the holes 4. The assembly 1 may then be placed on a spindle 9 which is rotated by a motor 10. The rotation of the assembly 1 causes a centrifugal force to urge the strands 5 to assume a radially outwardly extending position. The binder layers 7 may be positioned on each side of the layers of strands 5. The assembly 1 may then again be rotated to reposition any of the strands which may have moved out of the radial position during insertion of the binder layers. In some instances it may be desirable to insert the binder layers before rotating the assembly and then merely rotate the assembly after the binder layers are in position. After rotation of the assembly has properly oriented the strands, the assembly 1 may be placed under pressure such as by a vacuum bag or other suitable method to cause the strands 5 to become embedded between the binder layer 7. As a final step, the radially outer edge of the assembly 1 may be trimmed to provide a more uniform contour at the point where the outer edge of the fitting joins the fuel tank wall.

Since my previously mentioned U.S. Pat. No. 3,534,987 describes in detail the manner in which the fitting is attached to the wall, it will not be described in any further detail in this specification.

It should be understood that various modifications may be made in the number of layers of strands and binder material used in this method and that various shapes of fittings can be used without departing from the scope of the invention.

I claim:

1. A method of making a high strength fitting for a flexible wall container comprising the steps of:
   (A) providing a perforate rigid member having a pattern of holes extending therethrough;
   (B) inserting flexible strands through the holes of the rigid member;
   (C) positioning binder layers relative to the strands;
   (D) orienting the strands in a radially outwardly extending position; and
   (E) applying pressure to the strands and binder layers to embed the strands in the binder layers.

2. The method claimed in claim 1 wherein the strands are oriented in a radially outwardly extending position by rotating the fitting to apply centrifugal force to the strands.

3. The method claimed in claim 2 wherein the fitting is rotated both before and after the binder layers are positioned relative to the strands.

4. The method claimed in claim 1 including the step of trimming the outer edge of the assembled part.

5. The method claimed in claim 1 wherein the strands are aligned in two layers with separate binder layers applied to each layer of strands.

6. A method of making a high strength fitting for a flexible wall container comprising the steps of:
(A) inserting flexible strands through holes of a perforate rigid member;
(B) rotating the rigid member to orient the strands in a radially outwardly extending position from the member;
(C) position binder layers adjacent the strands;
(D) rotating the rigid member with the strands and binder layers thereon to further orient the strands; and
(E) applying pressure to the strands and binder layers to embed the strands in the binder layers.

References Cited
UNITED STATES PATENTS 2,675,252  4/1954   Haines _____ 285—200
2,772,101  11/1956  Smith _____ 285—200

EDWARD G. WHITBY, Primary Examiner

U.S. Cl. X.R.

156—267, 300; 285—200